(12) United States Patent
Lin

(10) Patent No.: US 9,059,639 B2
(45) Date of Patent: Jun. 16, 2015

(54) CONTROL CIRCUIT FOR POWER CONVERTER AND METHOD THEREOF

(71) Applicant: Richtek Technology Corporation, Chupei, Hsinchu (TW)

(72) Inventor: Hung-Lin Lin, Taipei (TW)

(73) Assignee: RICHTEK TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 14/266,865

(22) Filed: May 1, 2014

(65) Prior Publication Data

US 2014/0328099 A1     Nov. 6, 2014

(30) Foreign Application Priority Data

May 3, 2013  (TW) ............................. 102115946 A

(51) Int. Cl.
*H02M 3/335* (2006.01)
*H02M 1/00* (2006.01)

(52) U.S. Cl.
CPC .. *H02M 3/33523* (2013.01); *H02M 2001/0003* (2013.01)

(58) Field of Classification Search
CPC ............................ H02M 3/335; H02M 3/33507
See application file for complete search history.

(56) References Cited

U.S. PATENT DOCUMENTS

| 7,616,461 | B2 | 11/2009 | Yang et al. | |
|---|---|---|---|---|
| 2009/0219000 | A1* | 9/2009 | Yang | 323/282 |
| 2011/0182090 | A1* | 7/2011 | Huang | 363/26 |
| 2014/0071718 | A1* | 3/2014 | Lin et al. | 363/21.18 |
| 2014/0333281 | A1* | 11/2014 | Li | 323/318 |

FOREIGN PATENT DOCUMENTS

TW     I379501 B1     11/2012

* cited by examiner

*Primary Examiner* — Timothy J Dole
*Assistant Examiner* — Ishrat Jamali
(74) *Attorney, Agent, or Firm* — Birch, Stewart, Kolash & Birch, LLP

(57) ABSTRACT

A control circuit for a power converter includes a pulse width modulation signal generating circuit, a power estimation circuit, and a current limiting signal generating circuit. The pulse width modulation signal generating circuit generates pulse width modulation signals according to a current sense signal and a current limiting signal for configuring the conduction status of a switch circuit of the power converter. The power estimation circuit generates a power estimation signal for estimating the power which the power converter provides to a load. The current limiting signal generating circuit generates the current limiting signal according to the power estimation signal so that the power converter may provide suitable power to the load.

10 Claims, 4 Drawing Sheets

US 9,059,639 B2

CONTROL CIRCUIT FOR POWER CONVERTER AND METHOD THEREOF

CROSS-REFERENCE TO RELATED APPLICATIONS

This application claims the benefit of priority to Patent Application No. 102115946, filed in Taiwan on May 3, 2013; the entirety of which is incorporated herein by reference for all purposes.

BACKGROUND

The disclosure generally relates to a control circuit for a power converter and, more particularly, to the control circuit which may precisely configure the output power.

In the electronic products, the power converter is usually utilized to convert the input power to suitable voltage signals or current signal for providing power to the load. To avoid damaging the load of the power converter because of the excess energy provided by the power converter, the control circuit of the power converter must accurately estimate and adjust the power provided to the load.

In some power converters, the control circuit usually utilizes a simple mechanism to estimate the power provided to the load. Therefore, when the control circuit cannot accurately estimate the power provided to the load, the power converter may output insufficient power to the load so that the load may not function correctly or output excess power to the load so that the load may be damaged.

Moreover, when there are variations in the impedances of the circuit elements of the power converter, the power converter is coupled with the input power of different signal level or there are variations in the input power, the control circuit may still not accurately estimate the power provided to the load. When the load does not receive appropriate power from the power converter, the load may not function correctly of even be damaged.

Furthermore, the power converter may operate in the continuous current mode or the discontinuous current mode. Conventional control circuits do not have a simplified mechanism to estimate the power provided to the load in the two operation modes. Complicated circuit structures must be utilized, and the hardware complexity and cost are increased accordingly.

SUMMARY

In view of the foregoing, it may be appreciated that a substantial need exists for methods and apparatuses that mitigate or reduce the problems above.

An example embodiment of a control circuit for a power converter is disclosed, for configuring a conduction status of a switch circuit of the power converter for providing power to a load, comprising: a current limiting signal generating circuit, configured to operably generate a current limiting signal; a pulse width modulation (PWM) signal generating circuit, configured to operably generate a PWM signal according to a current sense signal and the current limiting signal for configuring the conduction status of the switch circuit; and a power estimation circuit, configured to operably generate a power estimation signal according to the PWM signal, the current sense signal and the current limiting signal; wherein the current limiting signal generating circuit compares the power estimation signal with a predetermined power signal for generating the current limiting signal; the power estimation circuit generates the power estimation signal according to the current sense signal at a third time point and according to a difference between the current sense signal at a fourth time point and the current sense signal at a second time point; the second time point is configured to be a time point at which the PWM signal maintains active to a predetermined proportion of the time the PWM signal maintains active; the third time point is later than the second time point with a predetermined delay time; and the fourth time point is a time point at Which the PWM signal turns from active to inactive.

Another example embodiment of a control method for a power converter is disclosed, for configuring a conduction status of a switch circuit of the power converter for providing power to a load, comprising: generating a current limiting signal; generating a PWM signal according to a current sense signal and the current limiting signal for configuring the conduction status of the switch circuit; generating a power estimation signal according to the PWM signal, the current sense signal and the current limiting signal; and comparing the power estimation signal with a predetermined power signal for generating the current limiting signal; wherein the power estimation signal is generated according to the current sense signal at a third time point and according to a difference between the current sense signal at a fourth time point and the current sense signal at a second time point; the second time point is configured to be a time point at which the PWM signal maintains active to a predetermined proportion of the time the PWM signal maintains active; the thud time point is later than the second time point with a predetermined delay time and the fourth time point is a time point at which the PWM signal turns from active to inactive.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
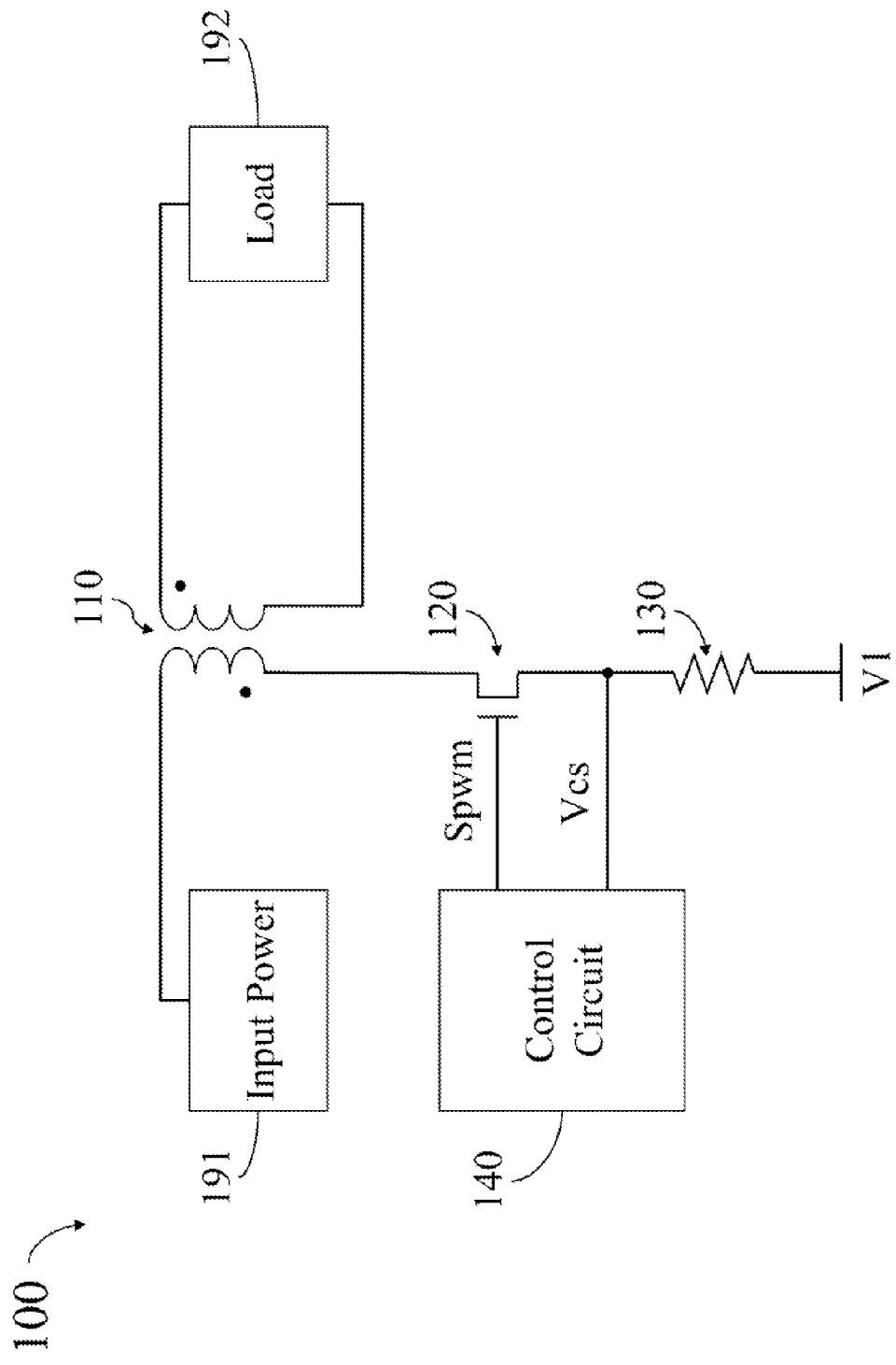
FIG. 1 shows a simplified functional block diagram of a power converter according to one embodiment of the present disclosure.

FIG. 1 shows a simplified functional block diagram of a power converter 100 according to one embodiment of the present disclosure. The power converter 100 comprises a transformer 110, a first switch circuit 120, a resistor 130 and a control circuit 140, and is configured to operably provide power to a load 192 according to an input power 191. For the purposes of conciseness and clear explanation, other elements and connections of the power converter 100 are not shown in FIG. 1.

In the embodiment in FIG. 1, the transformer 110 is coupled with the input power 191 and the load 192. The switch circuit 120 is coupled with the transformer 110 and the resistor 130. A first terminal of the resistor 130 is coupled with a predetermined signal level V1 (e.g., the voltage of the ground or other suitable voltage level). The control circuit 140 is coupled with a control terminal of the switch circuit 120 for configuring the conduction status of the switch circuit 120 by utilizing the pulse width modulation (PWM) signal Spwm. In this embodiment, the switch circuit 120 is realized with a transistor. In other embodiments, the switch circuit 120 may also be realized with other suitable active circuit elements and/or passive circuit elements.

The control circuit 140 is coupled with the resistor 130. The control circuit 140 may estimate the power which the power converter 100 provides to the load 192 according to a current sense signal Yes at a second terminal of the resistor 130, and adjust the conduction status of the switch circuit 120 with the PWM signal Spwm accordingly.

Figure 2:
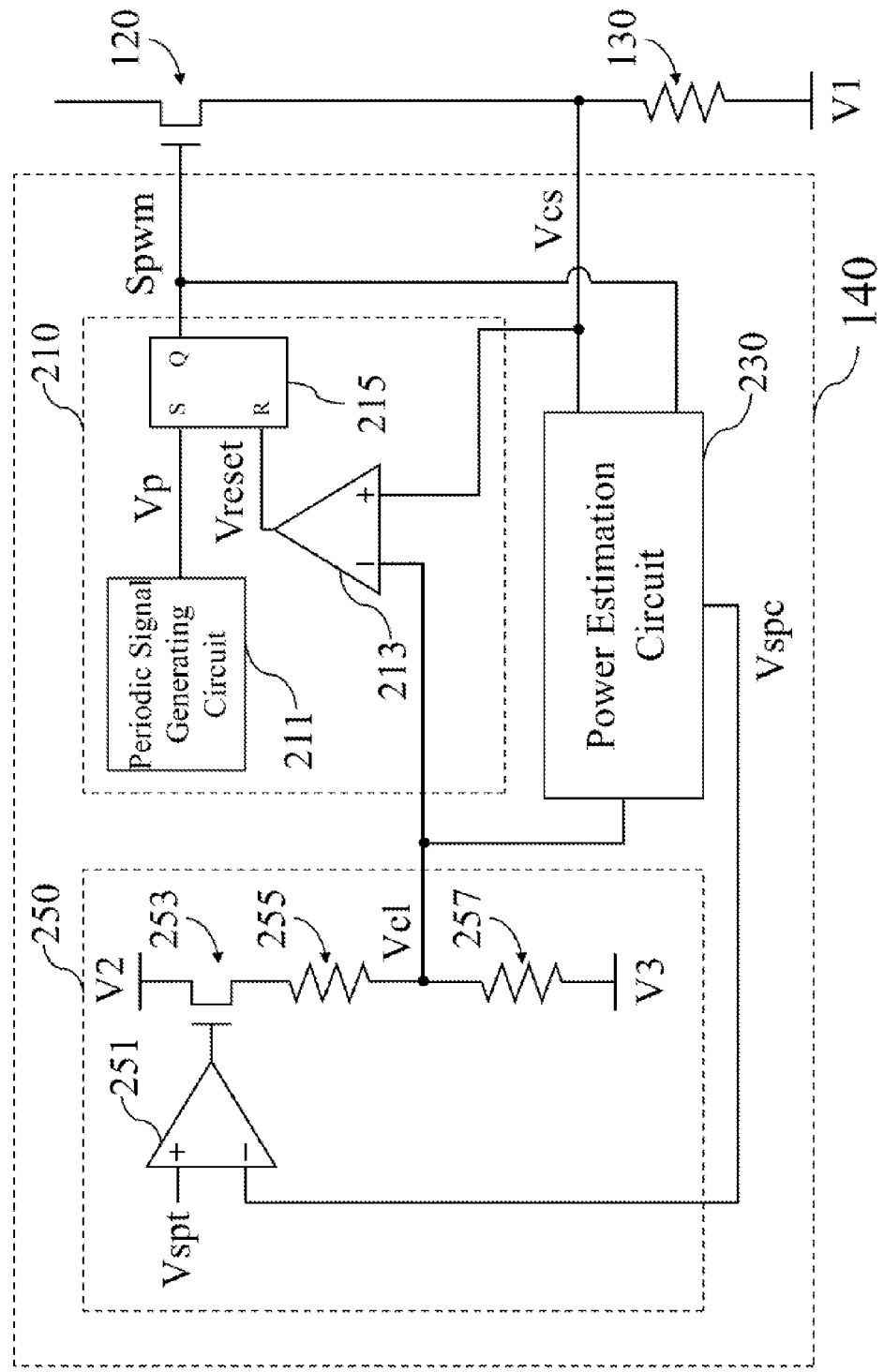
FIG. 2 shows a simplified functional block diagram of the control circuit in FIG. 1 according to one embodiment of the present disclosure.

FIG. 2 shows a simplified functional block diagram of the control circuit 140 in FIG. 1 according to one embodiment of the present disclosure. In the embodiment in FIG. 2, the control circuit 140 comprises a pulse width modulation (PWM) signal generating circuit 210, a power estimation circuit 230 and a current limiting signal generating circuit 250. For the purposes of conciseness and clear explanation, other elements and connections of the control circuit 140 are not shown in FIG. 2.

The PWM signal generating circuit 210 is configured to operably generate the PWM signal Spwm according to the current sense signal Vcs and a current limiting signal Vcl for configuring the conduction status of the switch circuit 120. The PWM signal generating circuit 210 may intermittently conduct the switch circuit 120 so that the power converter 100 may provide the required power to the load 192. In this embodiment, when the current sense signal Vcs is greater than the current limiting signal Vcl it means the power converter 100 has provided enough power to the load 192. The PWM signal generating circuit 210 configures the switch circuit 120 to be not conducted so that the power converter does not provide excess power to the load 192 and therefore the load 192 will not be damaged.

In the embodiment in FIG. 2, the PWM signal generating circuit 210 comprises a periodic signal generating circuit 211, a first comparator circuit 213 and an SR latch circuit 215. The periodic signal generating circuit 211 is configured to operably generate a periodic signal Vp which is transmitted to an S input terminal of the SR latch circuit 215. For example, the periodic signal generating circuit 211 may generate pulse wave signals, square wave signals, sinusoidal signals, ramp signals or other suitable periodic signals. The comparator circuit 213 may generate a reset signal Vreset according to the current sense signal Vcs and the current limiting signal Vcl, and transmit the reset signal Vreset to an R input terminal of the SR latch circuit 215. In this embodiment, when the periodic signal Vp is configured to be at the high signal level (the active high representation is utilized in this embodiment), the PWM signal Spwm generated at a Q output terminal of the SR latch circuit 215 is configured to be at the high signal level accordingly for configuring the switch circuit 120 to be conducted. When the current sense signal Vcs is greater than the current limiting signal Vcl, the comparator circuit 213 configures the reset signal Vreset to be at high signal level and the PWM signal Spwm generated at the Q output terminal of the SR latch circuit 215 is configured to be at the low signal level accordingly for configuring the switch circuit 120 to be not conducted. In other embodiments, the PWM signal generating circuit 210 may be realized with other suitable circuit structures for providing the required PWM signal Spwm.

The power estimation circuit 230 is configured to operably generate the power estimation signal Vspc according the current sense signal Vcs, the current limiting signal WI and the PWM signal Spwm. The power estimation signal Vspc may be utilized to estimation the power which the power converter 100 has provided to the load 192.

The current limiting signal generating circuit 250 is configured to operably generating the current limiting signal Vcl according, to a predetermined power signal Vspt and the power estimation signal Vspc.

In the embodiment in FIG. 2, the current limiting circuit 250 comprises a second comparator circuit 251, a second switch circuit 253 and resistors 255 and 257. When the power estimation signal Vspc is less than the predetermined power signal Vspt, the comparator circuit 251 provides a high-signal-level output signal for conducting the switch circuit 253. The output current of the switch circuit 253 flows through the resistors 255 and 257 for generating the required current limiting signal Vcl at a node between the resistors 255 and 257. When the power estimation signal Vspc is greater than the predetermined power signal Vspt, the comparator circuit 251 provides a low-signal-level output signal for configuring the switch circuit 253 to be not conducted. In other embodiments, the current limiting signal generating circuit 250 may also be realized with other suitable circuit structures for generating the required current limiting signal Vcl. Therefore, by configuring the predetermined power signal Vspt, the current limiting signal generating circuit 250 may provide the required current limiting signal Vcl. The PWM signal generating circuit 210 may configure the conduction status of the switch circuit 120 according to the current limiting signal Vcl, and the power converter 100 may output the required power to the load 192.

In the embodiment in FIG. 2, the switch circuit 253 is coupled with a second predetermined signal level V2 (e.g., the voltage level of 5 volts or other suitable voltage level). The resistor 257 is coupled with a third predetermined signal level V3 (e.g., the voltage level of the ground or other suitable voltage level).

Figure 3:
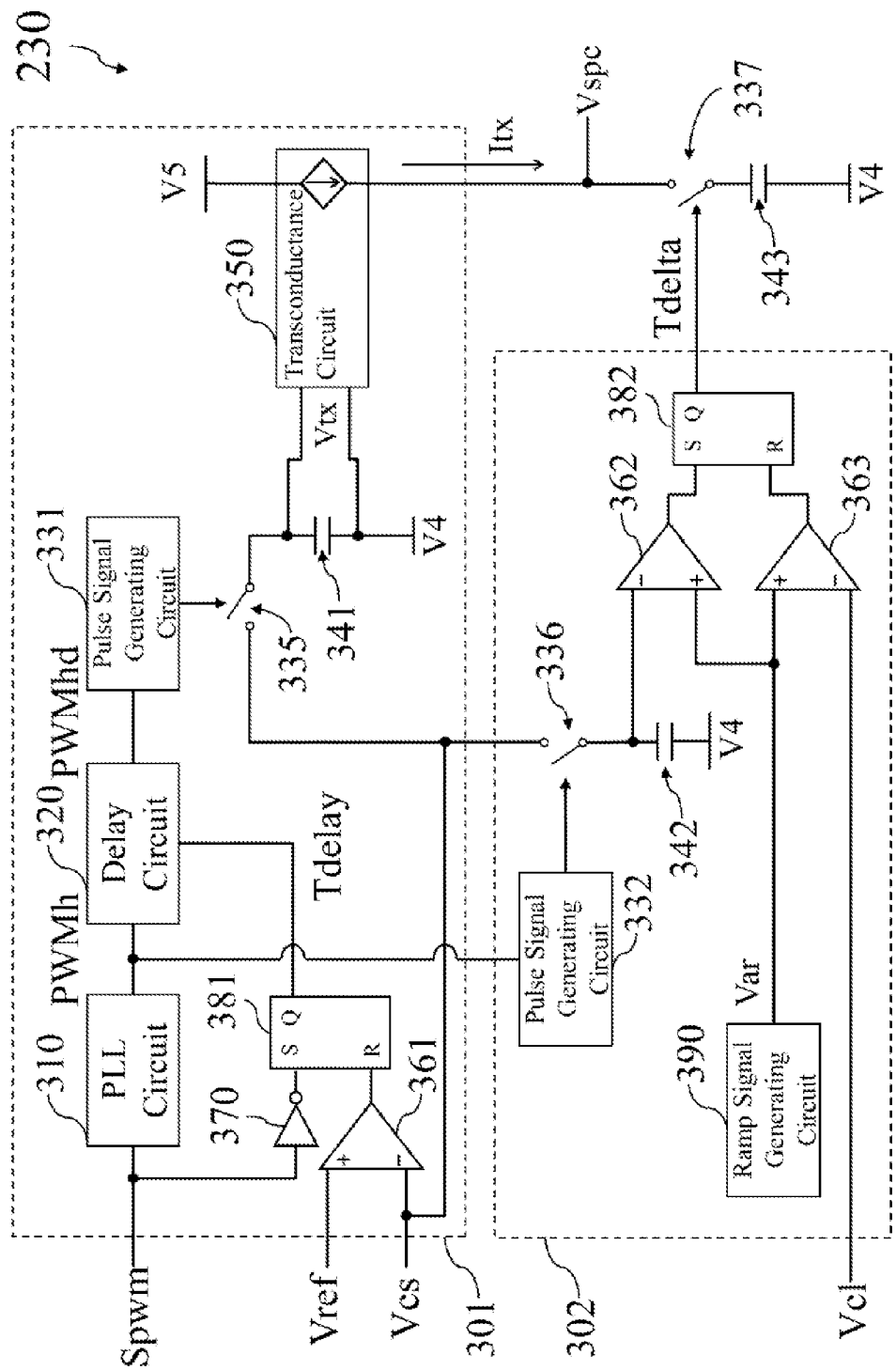
FIG. 3 shows a simplified functional block diagram of the power estimation circuit in FIG. 2 according to one embodiment of the present disclosure.

FIG. 3 shows a simplified functional block diagram of the power estimation circuit 230 in FIG. 2 according to one embodiment of the present disclosure. In the embodiment in FIG. 3, the power estimation circuit 230 comprises a phase locked loop (PLL) circuit 310, a delay circuit 320, pulse signal generating circuits 331 and 332, switch circuits 335, 336 and 337, capacitors 341, 342 and 343, a transconductance circuit 350, comparator circuits 361, 362 and 363, an inverter circuit 370. SR latch circuits 381 and 382 and a ramp signal generating circuit 390. For the purposes of conciseness and clear explanation, other elements and connections of the power estimation circuit 230 are not shown in FIG. 3.

The PLL circuit 310 is configured to operably generate a half-width signal PWMh according to the PWM signal Spwm. Thus, the time in which the half-width signal PWMh maintains active (e.g., at high signal level when the active high representation is utilized and at low signal level when the active low representation is utilized) is configured to be proportional to the time in which the PWM signal Spwm maintain active by a predetermined proportion of the time the PWM signal Spwm maintains active. For example, the predetermined proportion is configured to be ½ in this embodiment.

The inverter circuit 370 performs the inversion operation on the PWM signal Spwm and transmits the inverted PWM signal to an S input terminal of the SR latch circuit 381. The comparator circuit 361 compares a reference signal Vref with the current sense signal Vcs, and transmits the comparison result to an R input terminal of the SR latch circuit 381. The SR latch circuit 381 provides a delay time signal Tdelay at a Q output terminal for transmitting to the delay circuit 320.

The delay circuit 320 is configured to operably generate a half-width delay signal PWMhd according to the delay time signal Tdelay and the half-width signal PWMh. The half-width signal PWMh and the half-width delay signal PWMhd maintain active with substantially the same duration, but the time in which the half-width delay signal PWMhd maintain active is later than the time in which the half-width signal PWMh maintain active with a time difference. The delay circuit 320 configures the time difference according, to the delay time signal Tdelay so that the time difference is proportional to the delay time signal Tdelay.

The pulse signal generating circuit 331 configures the conduction status of the third switch circuit 335 according to the half-width delay signal PWMhd for configuring the time for charging or discharging the capacitor 341. The pulse signal generating circuit 332 configures the conduction status of the third switch circuit 336 according to the half-width signal PWMh for configuring the time for charging or discharging the capacitor 342.

The transconductance circuit 350 generates a current signal Itx according to a voltage difference Vtx across the two terminals of the capacitor 341 so as to configure the current signal Itx to be proportional to the voltage difference Vtx.

The ramp signal generating circuit 390 is configured to operably generate a ramp signal Var. The comparator circuit 362 compares the voltage of the capacitor 342 with the ramp signal Var, and transmits the comparison result to an S input terminal of the SR latch circuit 382. The comparator circuit 363 compares the current limiting signal Vcl with the ramp signal Var, and transmits the comparison result to an R input terminal of the SR latch circuit 382. A Q output terminal of the SR latch circuit 382 accordingly generates a switch control signal Tdelta for configure a conduction status of the fifth switch circuit 337. Therefore, the power estimation circuit 230 may configure the time in which the current signal Itx charges the third capacitor 343 by utilizing the switch control signal Tdelta so as to generate the required power estimation signal Vspc.

In the embodiment in FIG. 3, the capacitors 341, 342 and 343 are coupled with a fourth predetermined signal level V4 (e.g., the voltage level of the ground or other suitable voltage level). In other embodiments, the capacitors 341, 342 and 343 may be respectively coupled with the same or different signal levels according to different design considerations.

Figure 4:
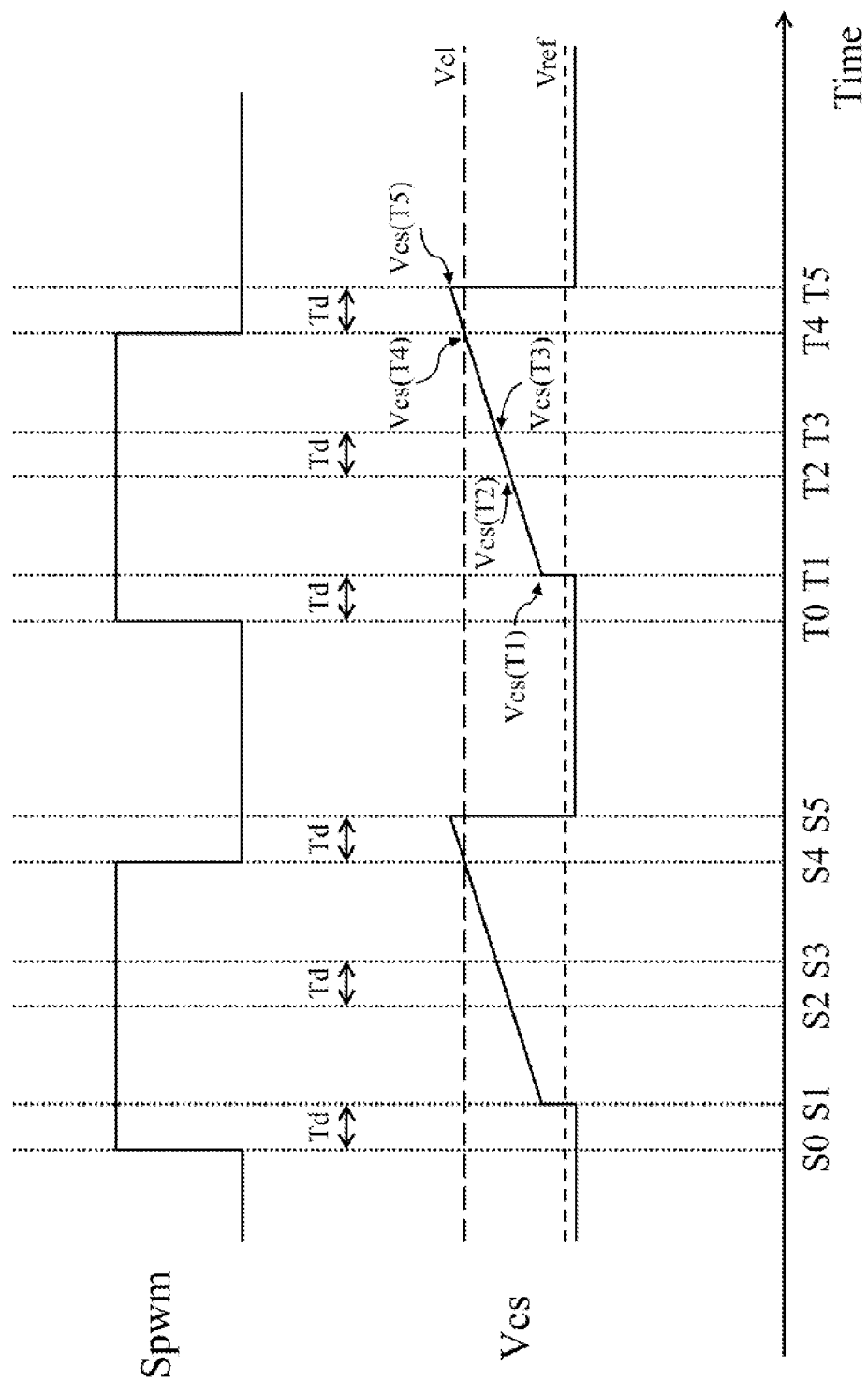
FIG. 4 shows a simplified timing diagram of several signals generated in the power converter in FIG. 1 according to one embodiment of the present disclosure.

FIG. 4 shows a simplified timing diagram of several signals generated in the power converter in FIG. 1 according to one embodiment of the present disclosure. The operations of the power converter 100 are further explained below with FIGS. 1~4. In the embodiment in FIG. 4, the time point T0 is a time point at which the PWM signal Spwm turns from inactive to active. The first time point T1 is a time point at which the current sense signal Vcs varies its signal value in response to the PWM signal Spwm at the time point T0. The second time point T2 is a time point at which the PWM signal Spwm maintain active to the predetermined proportion of the time the PWM signal Spwm maintains active. For example, the predetermined proportion is configured to be ½ in the embodiment in FIG. 4, and therefore T2 equals to (T0+T4)/2. The third time point T3 is a time point at which the current sense signal Vcs varies its signal value in response to the PWM signal Spwm at the time point T2. The fourth time point T4 is a tune point at which the PWM signal Spwm turns from active to inactive. The fifth time point T5 is a time point at which the current sense signal Vcs varies its signal value in response to the PWM signal Spwm at the time point T4.

The embodiment in FIG. 4 shows the PWM signal Spwm generated by the control circuit 140 and the current sense signal Vcs at the second terminal of the resistor 130. When the control circuit 140 configures the switch circuit 120 to be conducted with the RWM signal Spwm at the time point T0, the transformer 110 and the switch circuit 120 need a delay time Td to transmit the current to the resistor 130. Therefore, at the time point T1 (which is later than the tune point T0 by the delay time Td), the control circuit 140 may detect the corresponding current sense signal Vcs at the second terminal of the resistor 130.

In this embodiment, the load 192 locates at the secondary side of the transformer 110. The power provided by the power converter at the primary side of the transformer 110 is proportional the power received by the load 192 at the secondary side of the transformer 110. During the time points T0~T4, the power converter 100 provides at the primary side of the transformer 110 the power $P=(I(T4)*I(T4)-I(T0)*I(T0))*L/2$. $I(T0)$ and $I(T4)$ are respectively the currents which the transformer 110 provides at the primary side at the time points T0 and T4, and L is the inductance of the transformer 110.

In response to the currents $I(T0)$ and $I(T4)$ which the transformer 110 provides at the time points T0 and T4, the control circuit 140 respectively receives the current sense signals $Vcs(T1)$ and $Vcs(T5)$ at the time points T1 and T5, wherein $Vcs(T1)=I(T0)/R$, $Vcs(T5)=I(T4)/R$, $T1=T0+Td$ and $T5=T4+Td$. R is the resistance of the resistor 130. Therefore, the power P the power converter provides at the primary side of the transformer 110 is $P=(Vcs(T5)*Vcs(T5)-Vcs(T1)*Vcs(T1))*L/(2*R*R)=(Vcs(T5)+Vcs(T1))*(Vcs(T5)-Vcs(T1))*L/(2*R*R)$.

In the embodiment in FIG. 4, the second time point T2 equals to $(T0+T4)/2$ and the third time point T3 equals to $(T1+T5)/2$, wherein $T1=T0+Td$, $T3=T2+Td$ and $T5=T4+Td$. Moreover, during the time points T1~T5, the current sense signal Vcs varies substantially linearly. Therefore, the current sense signal $Vcs(T3)$ at the third time point T3 substantially equals to $(Vcs(T5)+Vcs(T1))/2$. Moreover, the difference between $Vcs(T5)$ and $Vcs(T1)$ equals to two times the difference between $Vcs(T5)$ and $Vcs(T3)$, and thus equals to two times the difference between $Vcs(T4)$ and $Vcs(T2)$. The power P the power converter provides at the primary side of the transformer 110 is $P=2*Vcs(T3)*2*(Vcs(T4)-Vcs(T2))*L/(2*R*R)=Vcs(T3)*(Vcs(T4)-Vcs(T2))*K$, wherein $K=2*L/(R*R)$. Therefore, the power P is proportional to the current sense signal $Vcs(T3)$ at the time point T3 and proportional to the difference between the current sense signal $Vcs(T4)$ at the time point T4 and the current sense signal $Vcs(T2)$ at the time point T2.

The power estimation circuit 230 may generate the required power estimation signal Vspc according to the current sense signal $Vcs(T3)$ and the difference between $Vcs(T4)$ and $Vcs(T2)$. Moreover, the signal value of the current sense signal $Vcs(T5)$ may not be accurately measured. The power estimation circuit 230 therefore generates the power estimation signal Vspc according to the difference between $Vcs(T4)$ and $Vcs(T2)$ instead of utilizing the difference between $Vcs(T5)$ and $Vcs(T3)$ for generating more accurate power estimation signal Vspc.

In the embodiment FIG. 3, the inverter circuit 370, the comparator circuit 361 and the SR latch circuit 381 are configured to operably generate the delay time signal Tdelay in response to the predetermined delay time Td according to the PWM signal Spwm, the reference signal Vref and the current sense signal Vcs. In one embodiment, the reference signal Vref is configured to a value close to zero (e.g., 0.1 volt or other suitable value). When the PWM signal Spwm is at low signal level at the time point S4, the inverter circuit 370 generates a high signal level output signal to the S input terminal of the SR latch circuit 381 so that the Q output terminal of the SR latch circuit 381 generates a high signal level output signal. Around the time point S5, the current sense signal Vcs is less than the reference signal Vref, the comparator circuit 361 generates high signal level output signal to the R input terminal of the SR latch circuit 381 so that the Q output terminal of the SR latch circuit 381 generates a low signal level output signal. The delay time signal Tdelay generated at the Q output terminal of the SR latch circuit 381 is therefore at high signal level between the time points S4~S5, and proportional to the predetermined delay time Td.

Because the delay circuit 320 generates the half-width delay signal PWMhd by delay the half-width signal PWMh according to the delay time signal Tdelay. The PLL circuit 310, the delay circuit 320 and the pulse signal generating circuit 331 configures the switch circuit 335 to be conducted during the time point T1 (i.e. T0+Td) and the time point T3 (i.e., T2+Td). When the capacitor 341 is charged or discharged with the current sense signal Vcs, the voltage difference across the capacitor 341 is proportional to the current sense signal Vcs(T3). Thus, the current signal Itx generated by the transconductance circuit 350 according to the voltage difference Vtx is proportional to the current sense signal Vcs(T3).

The PLL circuit 310 and the pulse signal generating circuit 332 configures the switch circuit 336 to be conducted during, the time points T0~T2 so that the capacitor 342 is charged or discharged to the signal value of the current sense signal Vcs(T2) by utilizing the current sense signal Vcs. Moreover, at the time point T4, the current sense signal Vcs(T4) is greater than or equal to the current limiting signal Vcl. The PWM signal generating circuit 210 configures the PWM signal Spwm to be at low signal level and the current limiting Vcl may be configured to be substantially equal to the current sense signal Vcs(T4).

Therefore, the comparator circuit 362, the comparator circuit 363 and the SR latch circuit 382 may generate the switch control signal Tdelta according to the current sense signal Vcs(T2) the current sense signal Vcs(T4) and the ramp signal Var for configuring the conduction status of the switch circuit 337. The comparator circuit 362 compares the current sense signal Vcs(T2) with the ramp signal Var. When the ramp signal Var is greater than the current sense signal Vcs(T2) the comparator circuit 362 generates a high signal level output signal to the S input terminal of the SR latch circuit 382 so that the switch control signal Tdelta at the Q output terminal of the SR latch circuit 382 is configured to be at high signal level. The comparator circuit 363 compares the current sense signal Vcs(T4) with the ramp signal Var. When the ramp signal Var is greater than the current sense signal Vcs(T4), the comparator circuit 363 generates a high signal level output signal to the R input terminal of the SR latch circuit 382 so that the switch control signal Tdelta at the Q output terminal of the SR latch circuit 382 is configured to be at low signal level. Therefore, the time in which the switch control signal Tdelta maintains active (at the high signal level in this embodiment) is proportional to the difference between the current sense signals Vcs(T4) and Vcs(T2). The conduction time of the switch circuit 337 may be configured so that the capacitor 343 may be charged with the current signal Itx with a time proportional to the difference between the current sense signals Vcs(T4) and Vcs(T2).

In the embodiment in FIG. 3, the power estimation signal Vspc is proportional to the current signal Itx and therefore proportional to the current sense signal Vcs(T3) at the time point T3. Moreover, the power estimation signal Vspc is proportional to the time charging the capacitor 337 with the current Itx and therefore proportional to the difference between the current sense signals Vcs(T4) and Vcs(T2). The power estimation signal Vspc may be accurately utilized to estimate the power P provided by the power converter 100 at the primary side of the transformer 110. The control circuit 140 may therefore accurately configure the power which the power converter 100 outputs to the load 192.

In the embodiment in FIG. 4, the functional block 301 comprises the PLL circuit 310, the delay circuit 320, the pulse signal generating circuit 331, the switch circuit 335, the capacitor 341, the transconductance circuit 350, the comparator circuit 361, the inverter circuit 370 and the SR latch circuit 381 for generating the current signal Itx proportional to the current sense signal Vcs(T3). The functional block 302 comprises the pulse signal generating circuit 332, the switch circuit 336, the capacitor 342, the comparator circuits 362 and 363, the SR latch circuit 382 and the ramp signal generating circuit 390 for cooperating with the PLL circuit 310 so that the time in which the switch control signal Tdelta maintains active is proportional to the difference between the current sense signals Vcs(T4) and Vcs(T2).

In another embodiment, the power estimation circuit 230 in FIG. 3 may be suitably modified. The current signal Itx is configured to be proportional to the difference between the current sense signals Vcs(T4) and Vcs(T2) and the time in which the switch control signal Tdelta maintains active is configured to be proportional to the current sense signal Vcs(T3). The power estimation signal Vspc may still be utilized to estimate the power P provided by the power converter 100 at the primary side of the transformer 110. The control circuit 140 may therefore accurately configure the power which the power converter 100 outputs to the load 192.

In the above embodiments, the power converter 100 operates in the continuous current mode and the current sense signal Vcs(T1) is not equal to zero. In other embodiments, the power converter 100 operates in the discontinuous current mode and the current sense signal Vcs(T1) may be equal to zero. According to the description above, the power estimation signal Vspc may still be utilized to accurately estimate the power P provided by the power converter 100 at the primary side of the transformer 110. Therefore, no matter the power converter operates in the continuous current mode or in the discontinuous current mode, the control circuit 140 may still accurately configure the power which the power converter 100 outputs to the load 192.

In the above embodiments, each functional block may be respectively realized with one or more circuit elements. Moreover, multiple functional blocks may be integrated according to different design considerations. For example, the periodic signal generating circuit 211 of the PWM signal generating circuit 210 may be configured to be at the exterior of the control circuit 140 and the switch circuit 120 may be integrated with the control circuit 140 in the same integrate circuit package.

In the above embodiments, the signals and functional blocks are explained with the active high representation. In other embodiments, each signals and functional blocks may be respectively realized with the active high representation or the active low representation according to different design considerations.

In the above embodiments, the control circuit 140 may accurately estimate the power P provided by the power converter 100 at the primary side of the transformer 110 by utilizing the current sense signal Vcs, and therefore accurately configure the power which the power converter 100 outputs to the load 192. The control circuit 140 may configure the power converter 100 to provide enough power to the load 192 and avoid providing excess power to the load 192 for damaging the load 192. Therefore, the load 192 may function correctly.

In the above embodiments, the power estimation signal Vspc is not affected by the impedances of the circuit elements or the signal value of the input power. Therefore, when there are variations in the circuit elements in the power converter 100, the power converter is coupled with the input power of different signal levels, or there are variations in the input power, the control circuit 140 may still accurately estimate the power P provided by the power converter 100 at the primary side of the transformer 110 and accurately configure the power Which the power converter 100 outputs to the load 192.

Moreover, no matter the power converter operates in the continuous current mode or in the di continuous current mode, the control circuit 140 may still accurately configure the power which the power converter 100 provides to the load 192. The hardware complexity and cost of the control circuit may be reduced accordingly.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The phrases "be coupled with," "couples with," and "coupling with" are intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

The term "voltage signal" used throughout the description and the claims may be expressed in the format of a current in implementations, and the term "current signal" used throughout the description and the claims may be expressed in the format of a voltage in implementations.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A control circuit for a power converter, for configuring a conduction status of a switch circuit of the power converter for providing power to a load, comprising:

a current limiting signal generating circuit, configured to operably generate a current limiting signal;
a pulse width modulation (PWM) signal generating circuit, configured to operably generate a PWM signal according to a current sense signal and the current limiting signal for configuring the conduction status of the switch circuit; and
a power estimation circuit, configured to operably generate a power estimation signal according to the PWM signal, the current sense signal and the current limiting signal;
wherein the current limiting signal generating circuit compares the power estimation signal with a predetermined power signal for generating the current limiting signal; the power estimation circuit generates the power estimation signal according to the current sense signal at a third time point and according to a difference between the current sense signal at a fourth time point and the current sense signal at a second time point; the second time point is configured to be a time point at which the PWM signal is at a predetermined portion of the total time the PWM signal maintains active; the third time point is later than the second time point with a predetermined delay time; and the fourth time point is a time point at which the PWM signal turns from active to inactive.

2. The control circuit of claim 1, wherein the power estimation circuit configures the current sense signal to charge a first capacitor according to the PWM signal and a delay time signal; and the power estimation circuit generates a current signal according to a voltage difference across the first capacitor so that the current signal is proportional to the current sense signal at the third time point.

3. The control circuit of claim 2, wherein the power estimation circuit generates a switch control signal according to the PWM signal and the current limiting signal; a time in which the switch control signal maintain active is proportional to a difference between the current sense signal at the fourth time point and the current sense signal at the second time point; and the switch control signal is utilized to configure a conduction status of a fifth switch circuit so as to charge a third capacitor with the current signal for generating the power estimation signal.

4. The control circuit of claim 1, wherein the power estimation circuit configures the current sense signal to charge a first capacitor according to the PWM signal and the current limiting signal; and the power estimation circuit generates a current signal according to a voltage difference across the first capacitor so that the current signal is proportional to a difference between the current sense signal at the fourth time point and the current sense signal at the second time point.

5. The control circuit of claim 4, wherein the power estimation circuit generates a switch control signal according to the PWM signal and a delay time signal; a time in which the switch control signal maintain active is proportional to the current sense signal at the third time point; and the switch control signal is utilized to configure a conduction status of a fifth switch circuit so as to charge a third capacitor with the current signal for generating the power estimation signal.

6. A control method for a power converter, for configuring a conduction status of a switch circuit of the power converter for providing power to a load, comprising:

generating a current limiting signal;
generating a PWM signal according to a current sense signal and the current limiting signal for configuring the conduction status of the switch circuit;
generating a power estimation signal according to the PWM signal, the current sense signal and the current limiting signal; and comparing the power estimation signal with a predetermined power signal for generating the current limiting signal;

wherein the power estimation signal is generated according to the current sense signal at a third time point and according to a difference between the current sense signal at a fourth time point and the current sense signal at a second time point; the second time point is configured to be a time point at which the PWM signal is at a predetermined portion of the total time the PWM signal maintains active; the third time point is later than the second time point with a predetermined delay time; and the fourth time point is a time point at which the PWM signal turns from active to inactive.

7. The control method of claim 6, further comprising:

configuring the current sense signal to charge a first capacitor according to the PWM signal and a delay time signal; and generating a current signal according to a voltage difference across the first capacitor so that the current signal is proportional to the current sense signal at the third time point.

8. The control method of claim 7, further comprising:

generating a switch control signal according to the PWM signal and the current limiting signal wherein a time in which the switch control signal maintain active is proportional to a difference between the current sense signal at the fourth time point and the current sense Signal at the second time point; and configuring a conduction status of a fifth switch circuit with the switch control signal so as to charge a third capacitor with the current signal for generating the power estimation signal.

9. The control method of claim 6, further comprising:

configuring the current sense signal to charge a first capacitor according to the PWM signal and the current limiting signal; and generating a current signal according to a voltage difference across the first capacitor so that the current signal is proportional to a difference between the current sense signal at the fourth time point and the current sense signal at the second time point.

10. The control method of claim 9, further comprising:

generating a switch control signal according to the PWM signal and a delay time signal wherein a time in which the switch control signal maintain active is proportional to the current sense signal at the third time point; and configuring a conduction status of a fifth switch circuit with the switch control signal so as to charge a third capacitor with the current signal for generating the power estimation signal.

\* \* \* \* \*